May 15, 1923.

E. L. BARNES

FUEL STOKING STRUCTURE

Filed April 7, 1919

WITNESSES.

INVENTOR.
E. L. Barnes.
BY Edmund W. Larry
ATTORNEY.

May 15, 1923.
E. L. BARNES
FUEL STOKING STRUCTURE
Filed April 7, 1919
1,455,756
7 Sheets-Sheet 4
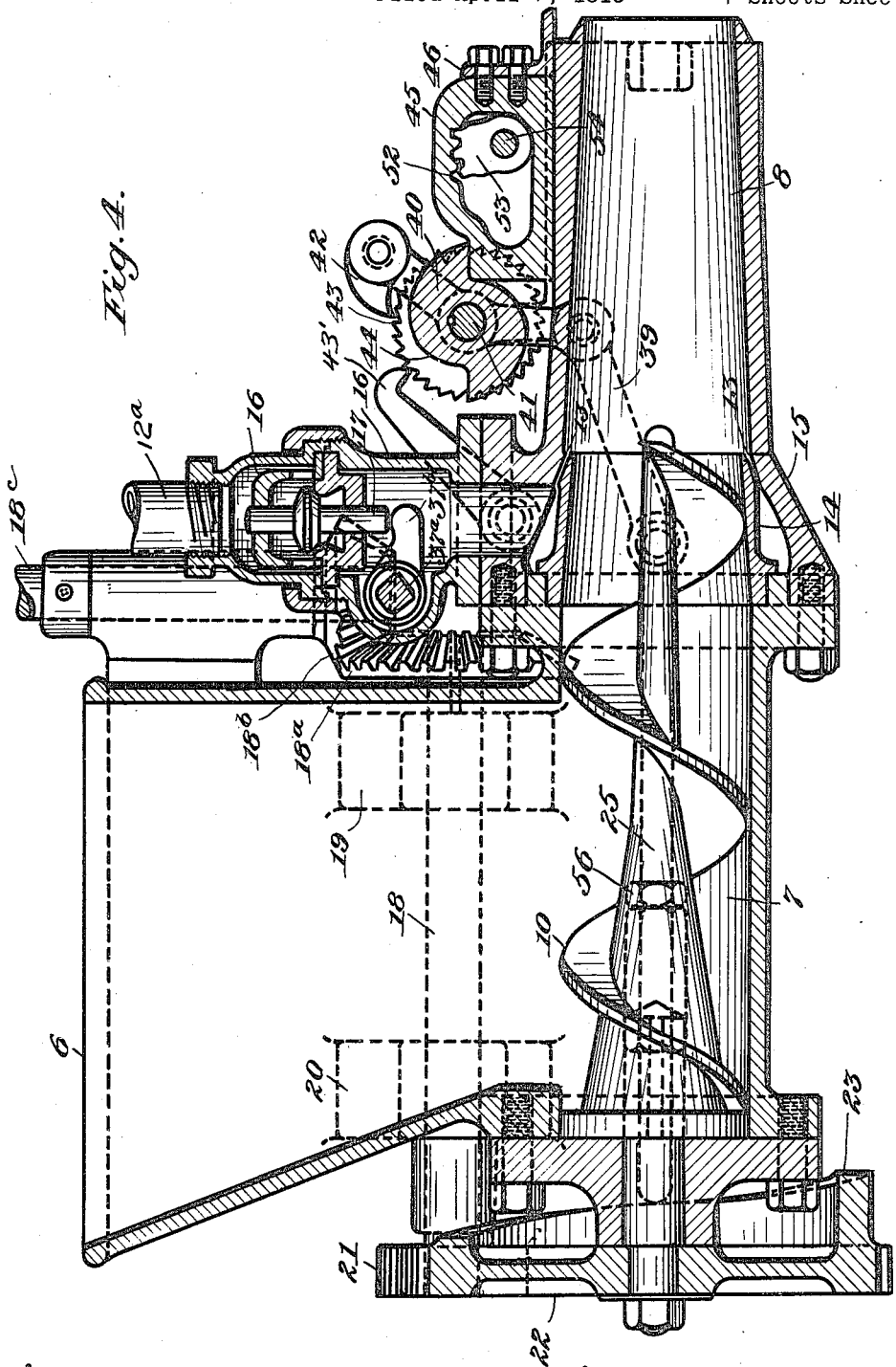

May 15, 1923.
E. L. BARNES
FUEL STOKING STRUCTURE
Filed April 7, 1919
7 Sheets-Sheet 5
1,455,756
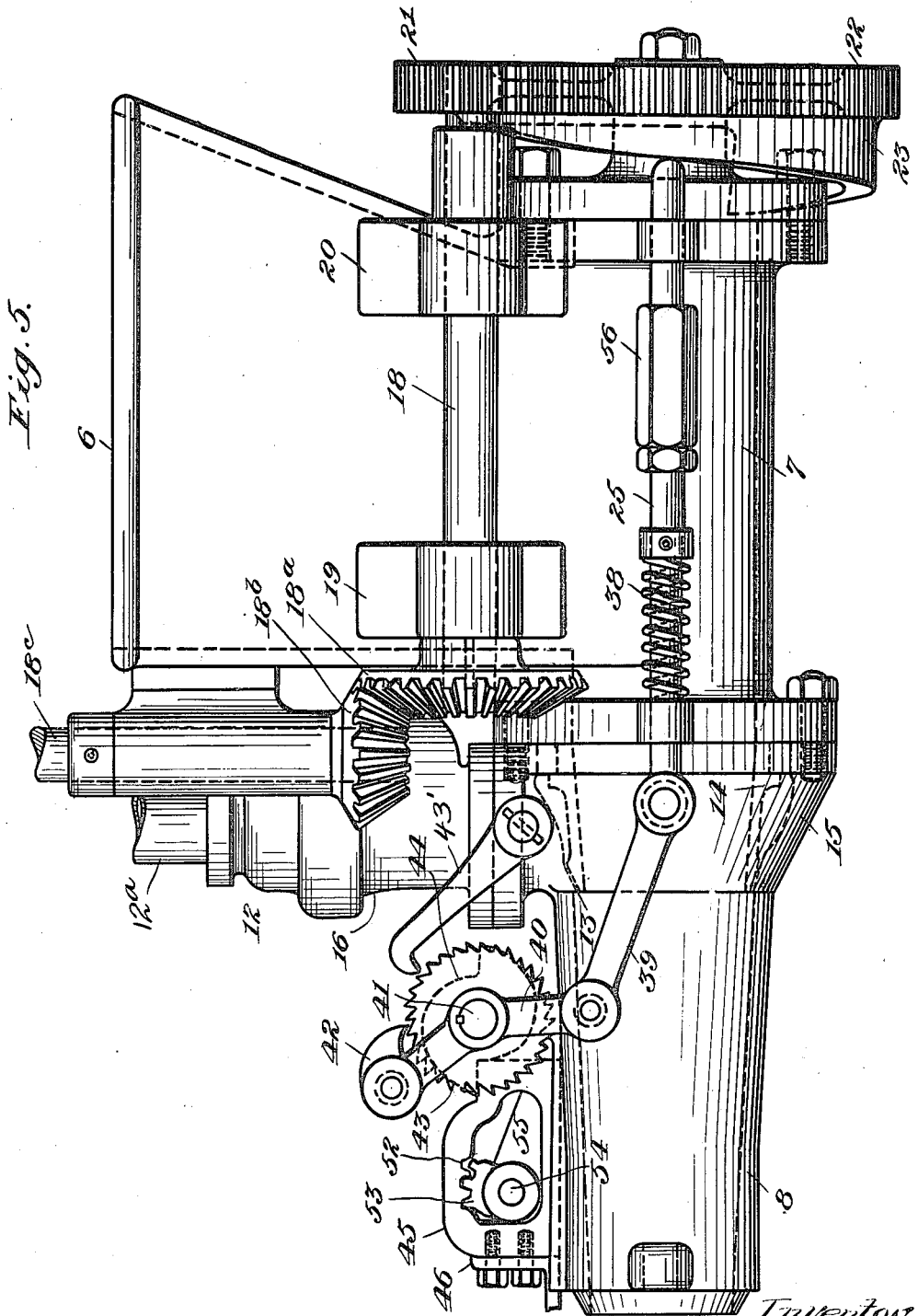

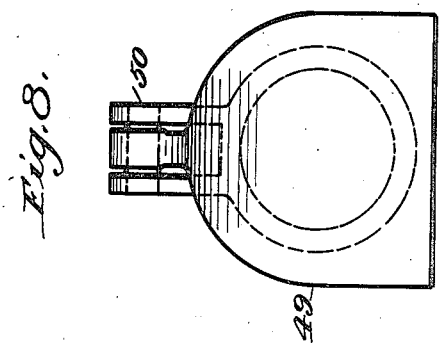
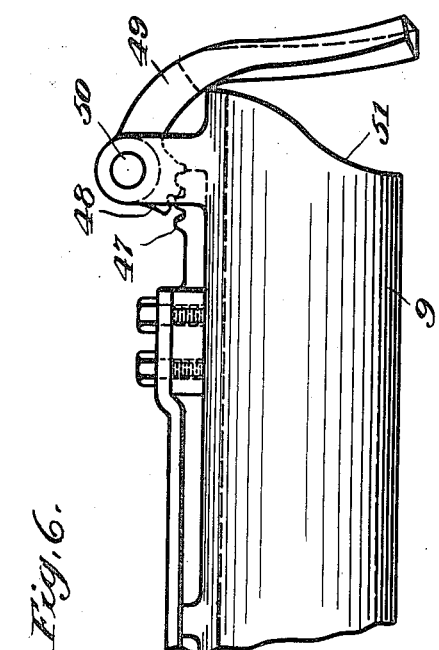
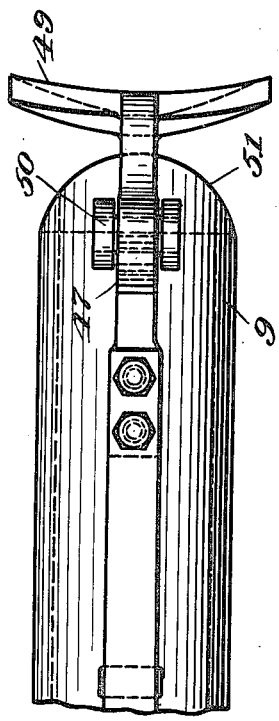
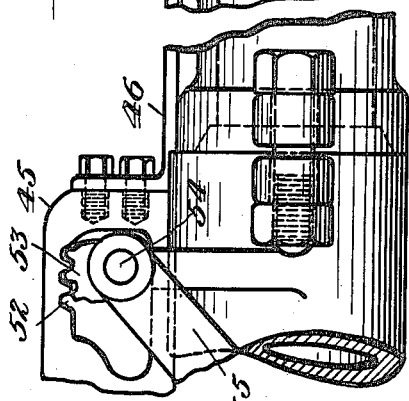
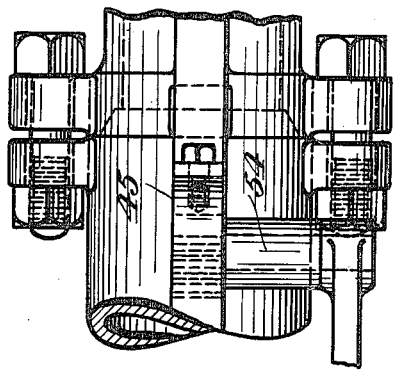

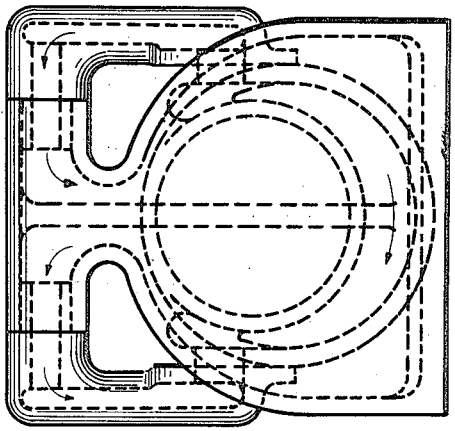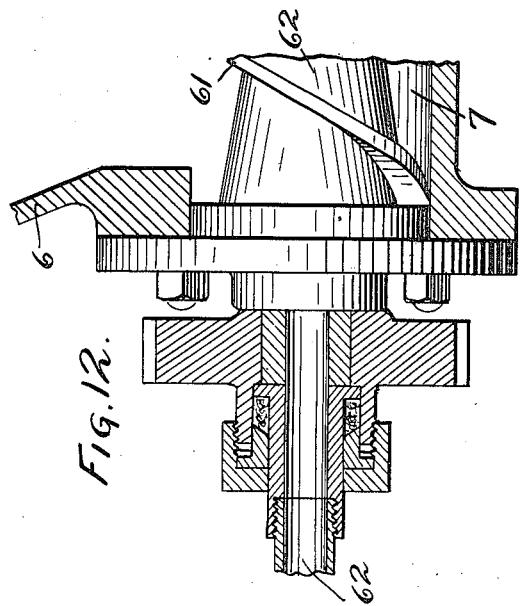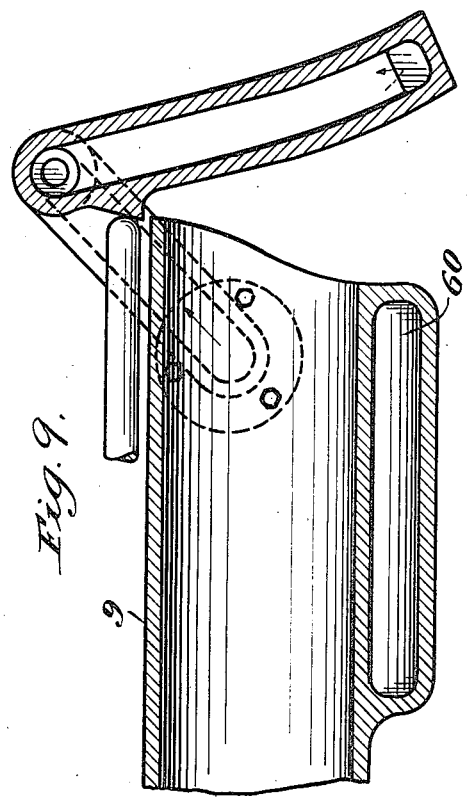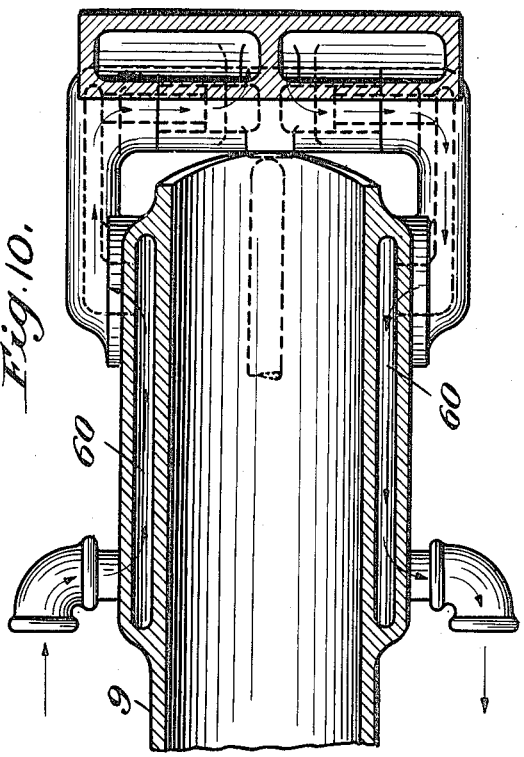

Patented May 15, 1923.

1,455,756

UNITED STATES PATENT OFFICE.

EUGENE L. BARNES, OF SEATTLE, WASHINGTON, ASSIGNOR TO AMERICAN DISTRICT STEAM COMPANY, OF NORTH TONAWANDA, NEW YORK, A CORPORATION OF NEW YORK.

FUEL-STOKING STRUCTURE.

Application filed April 7, 1919. Serial No. 287,998.

*To all whom it may concern:*

Be it known that I, EUGENE L. BARNES, a citizen of the United States of America, residing at Seattle, in the county of King and State of Washington, have invented certain new and useful Improvements in Fuel-Stoking Structures, of which the following is a specification, reference being had therein to the accompanying drawing.

This invention broadly relates to fuel-stoking structures and, more especially, to automatically operated apparatus therefor.

The primary object of the invention is to provide an efficient device for automatically stoking or feeding fuel—such as coal and the like—in definite and predetermined quantities into furnaces or fire-boxes of stationary, locomotive and marine boilers as well as to any other situation where the combustion of coal is to be effected.

A more specific object is to provide an improved form of fuel stoking or feeding mechanism which is automatically operated and which is to be operatively associated with fire-boxes or furnaces of various types for supplying fuel thereto in variable but predetermined quantities and in accordance with the requirements of the furnace.

Still another object within the contemplation of the invention, and an important one too, is to provide a device which is especially adaptable for the automatic stoking of either high or low grade coal, varying in degree of fineness—such as slack, screenings, or dust—and whereby such coal may be evenly distributed over the surface of the fire-grate, or combustion-surface, to any desired or required thickness or depth and in a manner which will eliminate the production of smoke.

A salient feature of my invention is its adaptability to small as well as large boiler installations; and yet, in either instance, the application of the device can readily be effected in such a manner that the fire-door of the furnace will be accessible at all times and without necessity of redesigning the furnace itself.

An important advantage of the device is that, when properly operated, it materially reduces the fuel-consumption per given amount of energy developed over that of present-day stoking devices; and this is attributable, in part at least, to the flexibility of my device and its automatic features.

In structures of this character, it is a desideratum that the components thereof shall, as far as practicable, be automatic in their operation, and be readily applied to existing constructions. In these particulars, as well as others, my invention fulfils all specific as well as general requirements.

With the specified objects in view, as also others which are more or less obvious, the invention resides in certain new components of a fuel-stoking structure and in the novel aggroupment of such components, in their effective action and coaction, all as are fully hereinafter explained and as set forth in the appended claims.

In order that the invention may readily be understood, I have revealed one of many practical embodiments thereof in the accompanying drawings, but which drawings, it is to be understood, are merely illustrative, since other embodiments and utilizations of my invention are obviously within the spirit of my invention, so long as they involve the underlying principles, with consequent advantages, thereof.

In these drawings:

Figure 4 is a view in vertical, longitudinal section of the same, on the line 4—4, Fig. 3;

Figure 5 is a view in side elevation, similar to Figure 2 but viewed from the opposite side of the structure;

Figure 6 is a view in side elevation of the nozzle-extension forming a component of the fuel-stoking structure;

Figure 7 is a view in top plan thereof;

Figure 8 is a view in end elevation of the same;

Figures 9, 10 and 11 are fragmentary views in vertical and horizontal section and diagrammatic, respectively, of a modified form of nozzle-cooling construction, being (in this instance) a water-jacket; and Figure 12 is also a fragmentary view, in sectional elevation, of a modified form of fuel-conveyor.

Figure 1:
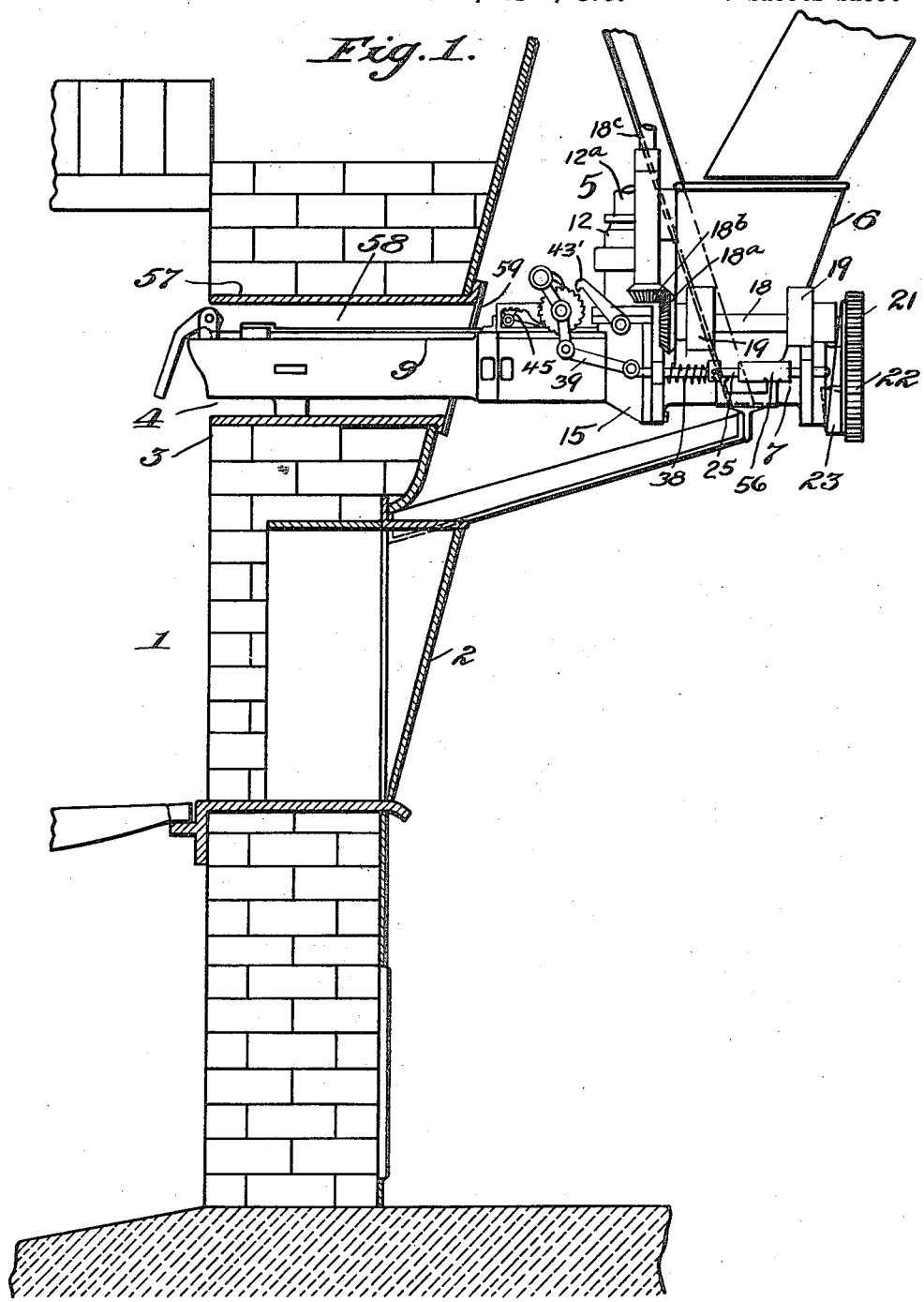
Figure 1 is a fragmentary view in elevation, partly in section, of a fuel-stoking structure constructed in accordance with my invention and as applied to a furnace of a stationary boiler.

Referring to the drawings, the reference-numeral 1 designates, generally, a furnace having a fire-door 2, as usual. The front wall 3 of the furnace is provided with a stoker-receiving opening 4 of the proper dimensions to permit the mounting therein of certain of the hereinafter-mentioned components of my improved stoking-structure marked, generally, 5 in Fig. 1.

This structure comprises a hopper 6, a conduit 7 associated therewith and including a fuel-receiving chamber 8 communicating with the hopper, and a nozzle 9 communicating at one end with the chamber 8, and provided at its opposite end with an opening through which fuel is to be discharged.

Suitably supported within the conduit-member 7, for rotation therein on an approximately horizontal axis, is a screw-conveyor or worm-element 10, the function of which is to move or convey fuel from the hopper 6 to the fuel-receiving chamber 8, from which point the fuel (periodically and in predetermined quantities) is moved (by means presently to be described) through the chamber 8 and nozzle 9 into the furnace or fire-box. The dimensions and form of these components are preferably determined by the size, character and capacity of the furnace or fire-box which is to be supplied with fuel.

Preferably and as shown, means are provided for effecting a discharge of the fuel (in given quantities) periodically from the fuel-receiving chamber 8: To this end, there is associated with this fuel-receiving chamber a blast or fluid-pressure supply device designated generally by 12 and which may be of any appropriate type and which, in this instance, connects, by a pipe 12ª, with a suitable source of supply (not shown) of steam, or air, and also preferably communicates with an annular space or opening 13 formed by two associated members 14 and 15, the former being encompassed by the latter, as shown in Fig. 4, for example. Communicating with the space or opening 13 is a valve-structure 16 which houses a valve 17 (Fig. 4) for mechanically controlling the admission or introduction of a pressure-medium—such as steam, air, gas, or the like—from a suitable source of supply (not shown) into the chamber 8. By means of this pressure-fluid, the fuel which has been deposited in or introduced into the chamber 8 by the worm-conveyor is forced through the nozzle and, thence, into the furnace. The action of the blast-device is preferably intermittent and controlled automatically and may be varied at the will of the operator, as hereinafter to be explained.

Any suitable means for actuating the worm-conveyor may be utilized; and, one form thereof which I prefer to employ involves a horizontal shaft 18, suitably journaled in bearings 19 and 20 at the side of the member 7 and adapted to be driven in any desired manner; as, for instance, through a bevel-gear 18ª that meshes with a similar gear 18ᵇ on a vertical drive-shaft 18ᶜ that is operated by a suitable driver or prime-mover (not shown). Fast on one end of the shaft 18 is a pinion 21 which meshes with a cam-gear 22 that is directly connected to the conveyor 10. The gear 22 is provided on its inner face with a cam-element 23 for operating two constantly-contacting rods 24 and 25, disposed at opposite sides of the conduit-member 7 and adapted to actuate certain instrumentalities (as presently to be explained) for controlling the movement of the fuel through the stoker and its discharge therefrom.

The rod 24 carries a rack 26 which is in engagement with a toothed-member 27 connected to a stub-shaft 28 and is integral with a weight-carrying and lifting arm 29, at the end of which is mounted an operating-weight 30. On the arm 29 is a dog 31 adapted to engage one or another of four teeth or lugs 32 formed on the toothed member 27.

Figure 2:
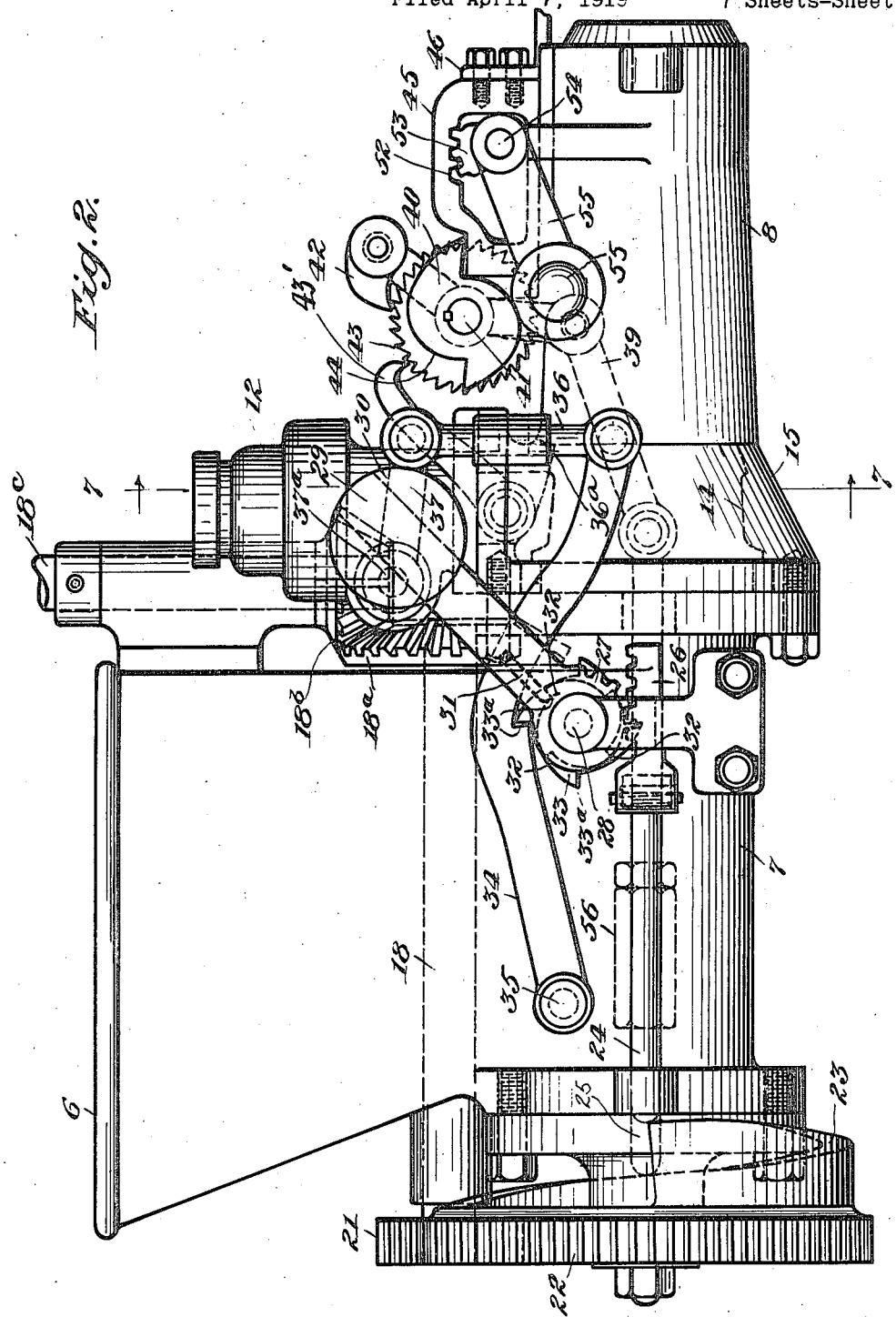
Figure 2 is a view in side elevation of the stoking structure itself.

It will now be seen that each revolution of the cam-gear 22 will, through the cam-element 23, effect a longitudinal movement of the rod 24 to a predetermined degree, and this (through the action of its rack 26 on the toothed-member 27) effects a partial revolution of the toothed-member and, thus, of the shaft 28 to raise the arm 29 into the position shown, for instance, in full lines in Fig. 2. It is then in a position to perform its prescribed function. On the shaft 28, back of the toothed-member 27 is also secured a cam-element 33 provided with four lifting lugs or cams 33ª. Now, when the rod 24 is, by the cam 23, permitted to move in the opposite direction, the weighted-arm 29 (under the influence of its weight 30) falls to a lower position through an arc of about ninety degrees (90°) and acts as a motor to turn the cam-element 33 which, in its rotation, lifts a contacting-arm 34 that is pivoted at 35 and which, at its opposite end, is jointed to an adjustable connecting-link 36 comprising two link-elements jointed together by a coupling 36ª and by which the proximate ends may be adjusted toward or away from each other to lengthen or shorten the link 36, as may be desired. This link is, in turn, pivotally connected to a valve-operating arm 37 which is fast on a short shaft 37ª, and this carries a valve-operating element 37ᵇ (Fig. 4) normally in engagement with the lower end of the valve 17 for opening and closing it.

It will be understood that, by the continuous revolution of the cam gear and the worm-conveyor, a certain and predetermined amount of fuel is, by the conveyor, moved from the hopper and deposited in the chamber 8; and, intermittently and predeterminately, the valve 17 is automatically opened by the valve-operating elements just referred to so as to permit the blast-device to operate and force the fuel through and out of the nozzle. Thus, by the structure just described, it is possible to actuate each independent valve-motion instantaneously and periodically and in exact unison or correspondence with the rotation of the worm-conveyor, and irrespective of how fast or slow the stoking-device is operating. By the periodic actuation of the valve, in the manner described, the pressure-medium is admitted or introduced from the source of supply into the chamber 8 so as to perform its function of forcing the fuel—delivered thereto by the conveyor—into the chamber and, thence, through the nozzle into the furnace. By adjusting the length of the connecting-link 36, it is possible so to regulate the action of the valve 17 as to admit the pressure-medium either in full volume, as may be requisite, or to throttle it down to a point where little or none is admitted. Thus, I have provided a complete and positively-acting valve-adjustment which is suitable for varying the action of the pressure-medium that periodically and intermittently effects a fuel-discharging action (in accordance with the revolution of the conveyor) to discharge a given amount of fuel from the chamber 8, through the nozzle 9, into the furnace, fire-box or other place of combustion.

Figure 3:
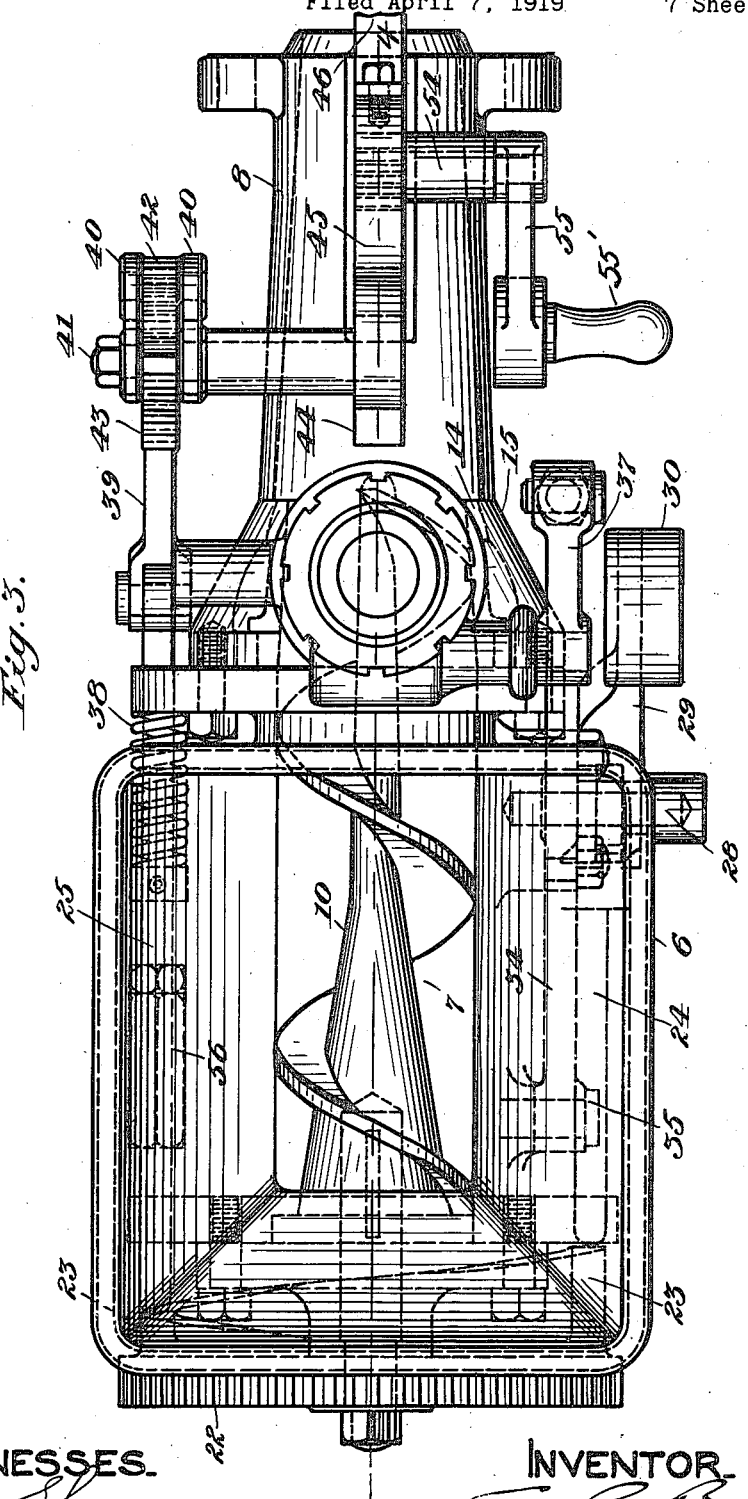
Figure 3 is a view in top plan thereof.

Preferably and as shown, means are provided for directing the discharge of the fuel from the nozzle of the structure, and such means will now be described: The aforementioned rod 25—at the side of the structure opposite that of the rod 24—is (as shown in Figs. 3 and 5) held in engagement with the cam 23 by a spring 38, and is pivotally connected to a link 39 which is, itself, connected to a bell-crank 40 that fulcrums on the shaft 41 and carries an actuating-pawl 42 which is adapted to engage with and actuate a ratchet wheel 43 mounted on the shaft 41. A pawl 43' is pivoted on the casing and normally holds the ratchet wheel against return movement. Likewise, a cam-element 44 is fast on and turns with the shaft 41; and this cam-element is in direct contact with a sliding-member 45. This member is connected to an actuating-element 46 which has rack-teeth 47 on its free-end that mesh with a toothed segment 48 attached to a pendant fuel-distributing member 49 that is pivoted at 50 and controls the open end 51 of the nozzle 9. The sliding-member 45 is provided with a rack 52 adapted to mesh with a toothed member 53 on a shaft 54 and to which is attached a weighted arm 55 having a handle 55', and by which the sliding member, the actuating-element 46, and the distributor 49 may be manually operated, if desired.

The distributor-member 49 receives its movement from the cam-gear 22 through the interposed parts already described, and its action is preferably effected to accord with the action of the conveyor and blast-device: Thus, it will now be clear that, upon each revolution of the cam-gear 22 and its cam 23, the rod 25 will be actuated in such manner as to cause the ratchet wheel 43 to assume a different position than it theretofore occupied and, in so doing, it causes the cam-element 44 to assume a relatively like position to that of the ratchet wheel 43. The rotation of the element 44 effects a sliding movement of the sliding-member 45, and movement of the latter causes the distributor 49 to assume a different position for each discharge of fuel onto the surface of the grate or place of combustion for each cycle, after which the slide 45 and distributor 49 are returned to their initial position and assume a position for repeating the operation, these parts being facilitated in their movement and action by the weighted arm 55 which, as already mentioned, may be moved manually, if desired, to effect an opening or closing of the distributor 49. The operation of this distributor-member is such that it acts as a fuel-distributor to effect a spreading of the fuel in proper quantity at different portions of the fire-bed. In other words, this distributing instrumentality starts to spread the fuel at the front of the fire-box and, charge-by-charge, the fuel is advanced toward the back of the furnace. This progressive action of the distributor is effected automatically by reason of the progressive and successively changing action of the controlling rods 24 and 25, as governed by the cam-gear in consonance with the action of the conveyor. Having spread the coal from front to rear, the distributor instantly falls back to its original position for a repetition of this operation. The purpose of this is to avoid piling of the coal at both ends of the furnace and, too, to avoid lapping back over coal that had already been deposited.

From the foregoing, it will now be clear that, as the worm or fuel-conveyor rotates continuously and as the cam-element is connected thereto and operates therewith and actuates the blast-valve 17 in synchronism therewith periodically to open and close the valve, the pressure-medium is admitted into the chamber 8 to discharge an equal quantity of fuel at each revolution of the conveyor. The action of the distributor is similarly effected so that its various positions are taken at the intervals between the actuation of the valve 17. Thus, the distributor is in a position of rest each time that the fuel is discharged.

It is desirable, at times, to vary the action of the distributor 49 and at the will of the operator: To accomplish this, an adjustingnut 56 is provided on the rod 25 whereby the said rod may be lengthened or shortened according as the nut is turned in one or the other direction on the rod 25. By thus varying the length of the rod 25, the position of the distributor 49 may be correspondingly changed and the positioning of the fuel from the nozzle may be varied. Hence, it will now be clear that, by reason of the provision of the adjusting means for varying the action of the distributor and of the blast-device, I am enabled to arrange at all times for the automatic supplying of fuel to the furnace or fire-box periodically and in regulated amounts which may be changed at the will of the operator whenever occasion or conditions demand.

Preferably and as shown in Fig. 1, for instance, the opening 4 in the furnace-wall is of larger dimensions than the diametral dimensions of the nozzle-components, and is provided with a sleeve 57 that extends through the wall of such size as to provide a space 58 around the nozzle 9 to permit the circulation of air therearound for cooling purposes. The amount of air admitted for this purpose may be controlled by a damper 59. Or, the nozzle 9 may be in the form of a water-jacket 60 (Figs. 9, 10 and 11) for the purpose of preventing damage to the stoker by reason of the high temperature of the furnace.

In lieu of, or in conjunction with, the blast-device already described, I may employ one of a somewhat different type: As shown in Fig. 12, this would involve making the fuel-conveyor 61 tubular, as at 62, or provide it with a hollow-shaft, so that a pressure-medium like steam, air under pressure, etc., could be projected therethrough so as to force the fuel from the fuel-receiving chamber 63 into and through the adjunctive nozzle.

From the foregoing, it will be perceived that I have devised a simple but very effective structure for accomplishing the desired results and by which fuel may be distributed progressively from one point in the furnace to another automatically, all as the exigencies of the furnace may require.

It is to be understood that, in disclosing the invention in connection with one concrete form of structure, I do not limit myself thereto, nor to the precise details thereof, since these are susceptible of a wide range of modification and variation without departing from the spirit of the invention or sacrificing any of the advantages thereof.

What I claim is:

1. An automatic fuel-stoking structure including a hopper, a conduit member communicating therewith and provided with a fuel-receiving chamber, a conveyor for carrying fuel from the hopper to the chamber, a blast-device communicating with the chamber, a fuel-distributor juxtaposed to the conduit member, and mechanism for operating it in timed relation to the action of the conveyor, for effecting a discharge and distribution of fuel from the chamber to progressively varying positions outside of the same.

2. An automatic fuel-stoking structure including a hopper, a conduit member communicating therewith and provided with a fuel-receiving chamber, a conveyor for carrying fuel from the hopper to the chamber, means for driving the conveyor, a blast-device communicating with the chamber, a fuel-distributing member juxtaposed to one end of the conduit member, and mechanism for operating it in timed relation to the action of the conveyor and including means deriving action from the conveyor drive, for effecting a discharge and distribution of fuel from the chamber to progressively varying positions outside of the chamber.

3. An automatic fuel-stoking structure including a conduit provided with a fuel chamber and with a fuel-discharge opening; a conveyor for carrying fuel to the chamber; means for operating the conveyor; a blast-device communicating with the chamber; a fuel-distributor operatively associated with the discharge opening in the conduit and operable to effect a spreading and distribution of the fuel discharged therefrom; and mechanism operatively associated with the fuel-distributor, the blast-device and the conveyor, and operating in timed relation to the conveyor, whereby discharge and distribution of fuel from the fuel chamber is effected to progressively varying positions beyond the discharge opening.

4. An automatic fuel-stoking structure including a hopper, a conduit member communicating therewith and provided with a fuel-receiving chamber, a conveyor for moving fuel from the hopper to the chamber, means for driving the conveyor, a fuel-distributor juxtaposed to the discharge end of the conduit member and acting in conjunction therewith to effect a spreading of fuel discharged therefrom, a blast-device communicating with the chamber for forcing fuel therefrom and into contact with the distributor, and mechanism operating the distributor in timed relation to the action of the conveyor and including means deriving action from the conveyor drive whereby discharge of fuel from the chamber under the action of the air-blast and against the distributor is effected to progressively varying positions outside of the chamber, in combination with a cooling device associated with the conduit member and distributor for maintaining the same relatively cool and against damage from heat developed by the fuel distributed.

5. An automatic fuel-stoker comprising a hopper; a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; a gear for driving the conveyor; a cam on the gear; an actuating rod operatively associated, at one end, with the cam; a pawl and ratchet mechanism operatively associated with the actuating rod; a cam-element operated by the pawl and ratchet mechanism; a sliding member operated by the cam-element; a connection between the sliding member and the fuel-distributor to operate the latter; and a blast-device communicating with the chamber to discharge fuel through the discharge opening.

6. An automatic fuel-stoker comprising a hopper; a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; a gear for driving the conveyor; a cam on the gear; an actuating rod operatively associated, at one end, with the cam; a pawl and ratchet mechanism operatively associated with the actuating rod; a cam-element operated by the pawl and ratchet mechanism; a sliding member operated by the cam-element; a connection between the sliding member and the fuel-distributor to operate the latter; a blast-device communicating with the chamber to discharge fuel through the discharge opening; and a weighted arm connected to the sliding member and normally acting against the action of the cam.

7. An automatic fuel-stoker comprising a hopper, a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; a gear for driving the conveyor; a cam on the gear; an actuating rod operatively associated, at one end, with the cam; a pawl and ratchet mechanism operatively associated with the actuating rod; a cam-element operated by the pawl and ratchet mechanism; a sliding member operated by the cam-element; a connection between the sliding member and the fuel-distributor to operate the latter; a blast-device communicating with the chamber to discharge fuel through the discharge opening; means for operating the blast-device, comprising an actuating rod operatively associated with the cam on the gear, a rack carried by the actuating rod, a segmental member in mesh with the rack, a cam-element operatively associated with the segmental member, an arm actuated by the segmental member, a link connected with the arm; a controlling valve for the blast-device, and a connection between the link and valve to operate the latter.

8. An automatic fuel-stoker comprising a hopper; a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; a gear for driving the conveyor; a cam on the gear; an actuating rod operatively associated, at one end, with the cam; a pawl and ratchet mechanism operatively associated with the actuating rod; a cam-element operated by the pawl and ratchet mechanism; a sliding member operated by the cam-element; a connection between the sliding member and the fuel-distributor to operate the latter; a blast-device communicating with the chamber to discharge fuel through the discharge opening; means for operating the blast-device, comprising an actuating rod operatively associated with the cam on the gear, a rack carried by the actuating rod, a segmental member in mesh with the rack, a cam-element operatively associated with the segmental member, an arm actuated by the segmental member, a link connected with the arm, a controlling valve for the blast-device, a connection between the link and valve to operate the latter, and a weighted arm acting against the action of the cam.

9. An automatic fuel-stoker comprising a hopper; a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; mechanism for actuating the distributor; a blast-device associated with the conduit; means common to the distributor-actuating means and to the blast-device whereby actuation of the distributor and blast-device is automatically effected periodically; and means for varying the action of the distributor-actuating mechanism and blast-device to vary the time of their functioning in relation to the action of the conveyor.

10. An automatic fuel-stoker comprising a hopper; a conduit communicating therewith and provided with a fuel-receiving chamber and with a fuel-discharge opening; a conveyor for moving fuel from the hopper to the chamber; a fuel-distributor operatively associated with the fuel-discharge opening in the conduit; mechanism for actuating the distributor; a blast-device communicating with the conduit; and means common to the distributor-actuating means and to the blast-device whereby actuation of the distributor and blast-device is automatically effected in predetermined time relation to the action of the conveyor.

12. An automatic fuel-stoker comprising a hopper; a conduit communicating with the hopper and provided with a fuel-receiving chamber and with a discharge opening; a conveyor for effecting movement of fuel from the hopper to the chamber; automatic means for effecting periodic discharge of fuel from the chamber, including a blast-device operatively associated with the chamber; a fuel-distributor operatively associated with the discharge opening in the conduit; independent mechanisms for oscillating the distributor and actuating the blast-device; and means, including a cam, for operating both mechanisms in timed relation.

12. An automatic fuel-stoker comprising a hopper; a conduit communicating with the hopper and provided with a fuel-receiving chamber and with a discharge opening; a conveyor for effecting movement of fuel from the hopper to the chamber; automatic means for effecting periodic discharge of fuel from the chamber, including a blast-device operatively associated with the chamber; a fuel-distributor operatively associated with the discharge opening in the conduit; independent mechanisms for oscillating the distributor and actuating the blast-device; and means, including a cam, for operating both mechanisms in timed relation, whereby fuel will be discharged from the chamber by the blast-device in predetermined relation to the position of the distributor.

13. An automatic fuel-stoker comprising a hopper; a conduit communicating with the hopper and provided with a fuel-receiving chamber and with a discharge opening; a conveyor for effecting movement of fuel from the hopper to the chamber; automatic means for effecting periodic discharge of fuel from the chamber, including a blast-device operatively associated with the chamber; a fuel-distributor operatively associated with the discharge opening in the conduit; independent mechanisms for oscillating the distributor and actuating the blast-device; means, including a cam, for operating both mechanisms in timed relation, whereby fuel will be discharged from the chamber by the blast-device in predetermined relation to the position of the distributor; and a cooling system extending through the fuel-distributor for maintaining the same relatively cool while fuel is discharged thereagainst.

14. An automatic fuel-stoker comprising a hopper; a conduit communicating with the hopper and provided with a fuel-receiving chamber and with a discharge opening; a conveyor for effecting movement of fuel from the hopper to the chamber; a blast-device communicating with the chamber; a valve forming a component of the blast-device and operative intermittently to introduce pressure-fluid into the chamber and force fuel therefrom; a fuel-distributor disposed adjacent the discharge opening; and a cam operatively associated with the valve and distributor whereby fuel will be discharged by the blast-device in accordance with the position of the distributor with relation to the discharge opening.

15. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast device to the chamber; a fuel-distributor disposed adjacent the discharge opening in the nozzle; a cam actuated by the driving mechanism; a rod actuated by the cam; a lever actuated by the rod; and ratchet and cam mechanism connecting the distributor and lever, whereby movement of the ratchet mechanism in one direction will move the distributor with relation to the discharge opening.

16. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; and means for returning the parts to their initial position after the distributor has been actuated.

17. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; and mechanism connecting the valve-controlling lever and second rod whereby movement of the rod by the rod-moving cam will effect periodic actuation of the control valve.

18. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; and mechanism connecting the valve-controlling lever and second rod whereby movement of the rod by the rod-moving cam will effect periodic actuation of the control valve, such mechanism including a rack connected to the rod, a gear actuated by the rack, a cam connected with the gear and rotatable thereby, and a portion of the valve-controlling lever disposed in the path of the cam and actuatable thereby to open the control valve.

19. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; and mechanism connecting the valve-controlling lever and second rod whereby movement of the rod by the rod-moving cam will effect periodic actuation of the control valve, such mechanism including a rack connected to the rod, a gear actuated by the rack, a cam connected with the gear and rotatable thereby, a portion of the valve-controlling lever disposed in the path of the cam and actuatable thereby to open the control valve, and means for adjusting the position of the rack with relation to the cam whereby the time of opening and closing of the control valve may be varied.

20. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; mechanism connecting the valve-controlling lever and second rod whereby movement of the rod by the rod-moving cam will effect periodic actuation of the control valve; and means for adjusting the position of a portion of each rod with relation to its actuating cam whereby the distributor and blast-device may be successively operated in predetermined timed relation.

21. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; mechanism connecting the valve-controlling lever and second rod whereby movement of the rod by the rod-moving cam will effect periodic actuation of the control valve, such mechanism including a rack connected to the rod, a gear actuated by the rack, a cam connected with the gear and rotatable thereby, and a portion of the valve-controlling lever disposed in the path of the cam and actuatable thereby to open the control valve; and means for returning the parts to their initial position.

22. An automatic fuel-stoker comprising a hopper; a fuel-receiving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; a second rod actuated by the rod-moving cam; a lever operatively connected with the valve which controls the admission of fluid to the fuel-chamber; mechanism connecting the valve-controlling lever and second rod whereby movement of the rod by the rod-moving cam will effect periodic actuation of the control valve, such mechanism including a rack connected to the rod, a gear actuated by the rack, a cam connected with the gear and rotatable thereby, and a portion of the valve-controlling lever disposed in the path of the cam and actuatable thereby to open the control valve; and means for returning the parts to their initial position, said means including an arm movable by the gear, and a weight disposed on the arm and normally creating pressure against the rack, through the gear.

23. An automatic fuel-stoker comprising a hopper; a fuel-reeciving chamber communicating with the hopper; a nozzle provided with a discharge opening communicating with the fuel-receiving chamber; a conveyor for passing fuel from the hopper to the chamber; driving mechanism for the conveyor; a blast-device communicating with the chamber; a valve for controlling the admission of fluid-pressure from the blast-device to the chamber; a fuel-distributor disposed adjacent the discharge opening in the nozzle; a rod-moving cam actuated by the driving mechanism; a rod actuated by the cam; a lever actuated by the rod; ratchet and cam mechanism connecting the distributor and lever, whereby movement of the ratchet mechanism in one direction will move the distributor with relation to the discharge opening; and means for manually operating the distributor.

In testimony whereof I affix my signature in presence of two witnesses.

EUGENE L. BARNES.

Witnesses:
 HOWARD E. LONG,
 CHARLES R. BISHOP.